United States Patent

Kurtz et al.

[11] Patent Number: 5,155,596
[45] Date of Patent: Oct. 13, 1992

[54] FILM SCANNER ILLUMINATION SYSTEM HAVING AN AUTOMATIC LIGHT CONTROL

[75] Inventors: Andrew F. Kurtz, Rochester; Glenn L. Kennel, Williamson; David J. Snider, Spencerport, all of N.Y.

[73] Assignee: Eastman Kodak Company, Rochester, N.Y.

[21] Appl. No.: 620,993

[22] Filed: Dec. 3, 1990

[51] Int. Cl.⁵ .............................. H04N 5/253
[52] U.S. Cl. ................................. 358/214; 358/54; 358/209
[58] Field of Search ............... 358/214, 54, 98; 352/105, 96; 250/227.3, 237 R; 355/1, 32, 35, 67, 110, 105, 104; 362/32, 322

[56] References Cited

U.S. PATENT DOCUMENTS

| | | | |
|---|---|---|---|
| 3,212,417 | 10/1965 | Gundlach | 95/1.7 |
| 3,241,440 | 3/1966 | Kugler | 88/24 |
| 3,988,537 | 10/1976 | Cooley | 178/7.6 |
| 4,226,522 | 10/1980 | Marshall | 355/1 |
| 4,310,847 | 1/1982 | Frohbach et al. | 358/84 |
| 4,321,630 | 3/1982 | Kramer | 358/294 |
| 4,329,715 | 5/1982 | Attridge | 358/214 |
| 4,396,834 | 8/1983 | Appel et al. | 250/216 |
| 4,422,100 | 12/1983 | DeVall et al. | 358/293 |
| 4,425,599 | 1/1984 | Rieder et al. | 362/32 |
| 4,568,984 | 2/1986 | Juergensen et al. | 358/293 |
| 4,690,564 | 9/1987 | Morgenstern et al. | 356/445 |
| 4,791,480 | 12/1988 | Muranaka | 358/98 |
| 4,797,711 | 1/1989 | Sasada et al. | 355/32 |
| 4,868,383 | 9/1989 | Kurtz et al. | 250/228 |
| 5,012,346 | 4/1991 | DeJager et al. | 358/214 |

Primary Examiner—Michael Razavi
Assistant Examiner—Tuan V. Ho
Attorney, Agent, or Firm—Robert L. Randall

[57] ABSTRACT

An illumination system for a film scanner is disclosed which comprises a light source and optics for providing a line of light on a film. Light transmitted through the film is imaged onto photosensor elements such as CCD arrays. In order to obtain a high quality electronic image from various types of film, an integrating cylinder is used to provide a line of diffuse light on the film, and light delivered to the integrating cylinder is controlled in accordance with the particular type of film being scanned and the operating conditions of the apparatus.

11 Claims, 6 Drawing Sheets

LINEAR DISTRIBUTION ALONG SLIT

FILM SCANNER ILLUMINATION SYSTEM HAVING AN AUTOMATIC LIGHT CONTROL

CROSS REFERENCE TO RELATED APPLICATIONS

Reference is made to U.S. patent applications: Ser. No. 421,894, entitled "Illumination System for a Film Scanner," filed on Oct. 16, 1989; Ser. No. 373,309, entitled "Method and Apparatus for Generating a High Definition Electronic Signal From a Line Scan of a Color Original," filed on Jun. 29, 1989; Ser. No. 406,407, entitled "Motion Picture Telecine Balanced For Negative Scanning," filed on Sep. 12, 1989; Ser. No. 422,328, entitled "Telecine Scanning Apparatus With Spectrally-Shifted Sensitivities Responsive to Negative or Print Film Dyes," filed on Oct. 16, 1989; and Ser. No. 421,893, entitled "A Beam Splitter For Color Imaging Apparatus," filed Oct. 16, 1989. All of these applications are assigned to the assignee of the present invention.

FIELD OF THE INVENTION

This invention relates to an illumination system for a film scanner, and more particularly, to an illumination system which is particularly suitable for use with a wide range of films in a telecine film scanner.

DESCRIPTION OF THE PRIOR ART

One type of telecine film scanner typically includes a light-sensitive linear charge-coupled device (CCD) which provides a serial output representing a line of a television raster. For color television, the film scanner can include an assembly of three separate CCD arrays, one for each of the primary colors. The film is driven at a uniform rate past a light beam provided by an illumination system, and an illuminated section of the film is imaged onto each CCD array. The film motion provides the vertical (frame) scan, and the linear cycling of the CCD arrays provides the horizontal (line) scan. A scanner of this type is described in U.S. Pat. No. 4,205,337.

In film scanners, it is common to provide an illumination system which produces a line of light across the film. The light source in such systems produces a circularly symmetric light beam, and a problem in these systems is to provide for an efficient conversion of the circular beam to a uniform line distribution of the light. In U.S. Pat. No. 4,797,711, for example, there is disclosed a scanner in which a transparent cylindrical rod is arranged to produce a line of light on an original. Light from a light source passes through color filters and is then directed into one end of the cylindrical rod. Light reflected from the original is imaged onto a CCD line sensor.

Another type of illumination system for a film scanner is shown in U.S. Pat. No. 3,988,537. Light from a fluorescent lamp is directed onto a film through cylindrical lenses and an aperture plate having an elongated aperture therein. Light transmitted through the film is directed to a photosensor. One of the main problems of the illumination systems shown in the two patents is that they do not provide a uniform line of diffuse light to an original such as film, and thus, artifacts on the original, e.g. scratches, will appear in an image produced from the scanned information. A further disadvantage of the systems shown in the patents is that they are not adapted to change the spectral content of the illumination in accordance with the type of film being scanned.

An improved type of illumination system is disclosed in U.S. Pat. No. 4,868,383, which is assigned to the assignee of the present application. This patent discloses a linear light source for a film scanner which includes means for generating an intense beam of light and an elongated cylindrical integrating cavity having diffusely reflective walls. The intense beam is introduced into the cavity through an input port, and a uniform line of light is emitted through an output slit which extends parallel to the longitudinal axis of the cylindrical integrating cavity. Such a light source produces a line of diffuse light which has a uniform linear and angular distribution, and excellent results can be obtained over a wide range of operating conditions. There is a need, however, in certain types of scanners, such as telecine film scanners, for greater control of the light output from the light source in order to effectively scan different types of film.

SUMMARY OF THE INVENTION

It is an object of the present invention to overcome the problems in the prior art discussed above and to provide an improved illumination system for a film scanner.

In accordance with one aspect of the present invention there is provided an illumination system for a film scanner, the system being adapted to provide a line of illumination on a film which is supported for movement in a film gate of the scanner, the system comprising: a light source which is adapted to provide a light beam along an optical path in the system; an integrating cylinder located along the optical path for receiving light from the source and for producing a line of diffuse illumination on the film; and light control means for controlling the amount of light which is delivered to the integrating cylinder, the light control means including adjustable regulating means in the path between the source and the cylinder for controlling the amount of light which travels along the path to the cylinder.

In one embodiment of the present invention, an illumination system is provided for a film scanner in which a film is scanned as it is advanced through a film gate in the scanner. The illumination system includes a xenon lamp which produces a light beam which travels along an optical path to the film gate. The light beam from the xenon lamp passes through a hot mirror (IR reflector) and an IR absorber which filter IR radiation from the beam. From the IR absorber, the beam passes through a set of shaping filters and a $D_{min}$ filter. Certain of the shaping filters and the $D_{min}$ filter can be selectively removed from the optical path to provide for the scanning of both negative and print films. The beam from the filters passes through an aperture wheel and is then condensed into an integrating cylinder which provides a uniform line of diffuse light on the film. A light control means is adapted to control the current to the xenon lamp and to control the position of the aperture wheel in order to provide light to the integrating cylinder in accordance with the amount of light needed for the particular film being scanned. Light transmitted through the film passes through a projection lens which directs the light onto a beam splitter. The beam splitter divides the light into one light beam for a chrominance channel in the scanner and another beam for a luminance channel.

The present invention provides a number of advantages over known illumination systems for film scanners. A principal advantage of the present invention is that it is adapted to provide the light level needed in a film scanner for different types of film and different modes of operation. Another advantage of the disclosed illumination system is that it is particularly effective in suppressing the effects of film surface damage on a reproduced image. The illumination system produces an intense line of light having a highly uniform intensity along the line and a nearly uniform angular distribution. Temporal fluctuations in the light source are minimized by employing the light from the integrating cavity as a feedback signal to regulate the light source.

Other features and advantages will become apparent upon reference to the following description of the preferred embodiment when read in light of the attached drawings.

DESCRIPTION OF THE PREFERRED EMBODIMENT

Figure 1:
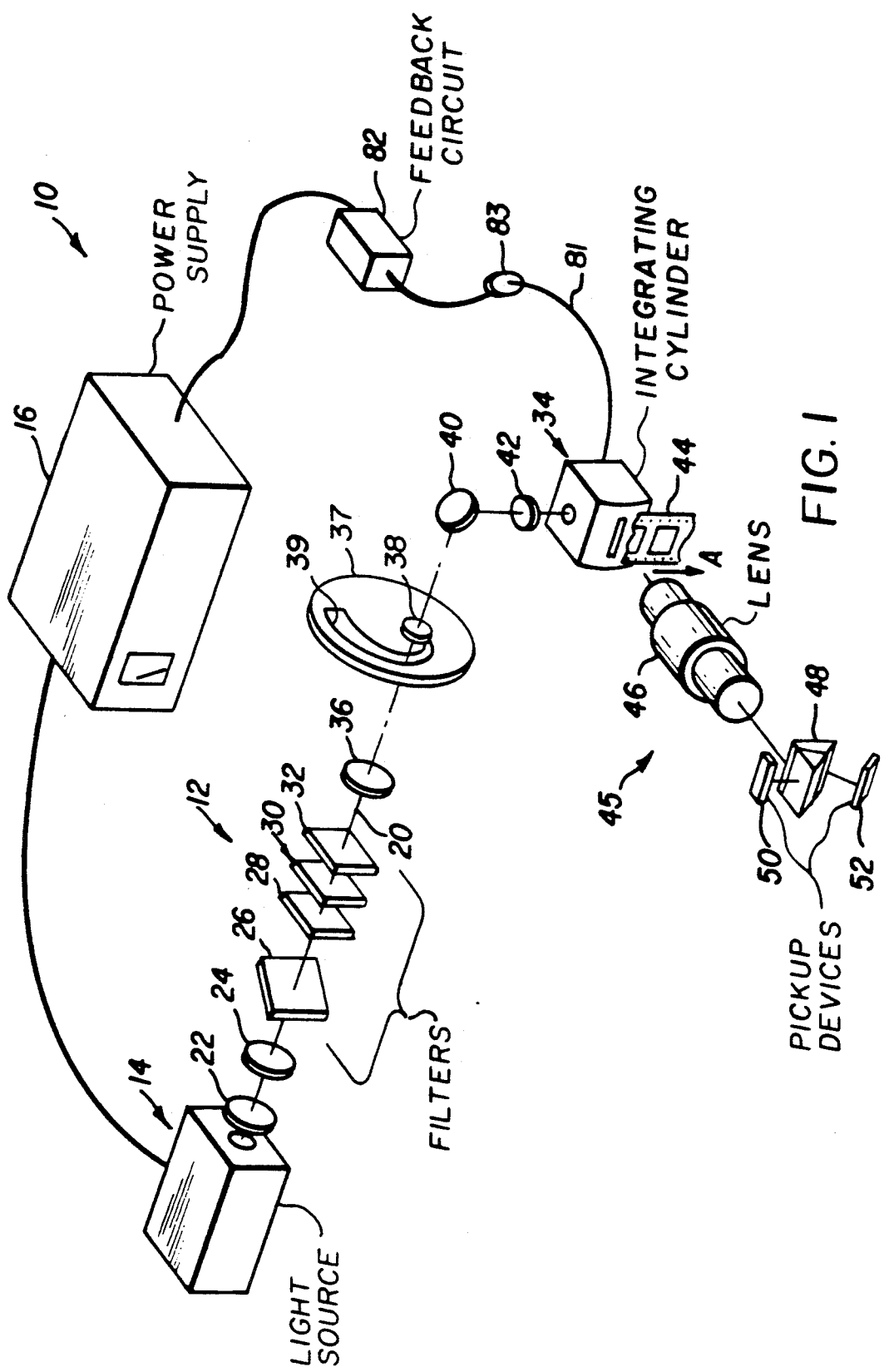
FIG. 1 is a schematic perspective view showing the illumination system of the present invention in combination with certain elements of a film scanner.

The illumination system of the present invention can be used with any film scanner which requires a line illumination of a film. However, it is particularly suitable for use with a telecine film scanner in which light from an illuminated line of film is divided into a luminance image and a chrominance image. Such a film scanner is disclosed in the aforementioned U.S. patent application, Ser. No. 373,309, entitled "Method and Apparatus for Generating a High Definition Electronic Signal From a Line Scan of a Color Original." The present invention can also be used with a telecine film scanner in which light from an illuminated section of the film is transmitted to three separate channels for processing, one channel for each of the primary colors. A film scanner of this type is disclosed in the aforementioned U.S. patent application, Ser. No. 422,328, entitled "Telecine Scanning Apparatus With Spectrally-Shifted Sensitivities Responsive to Negative or Print Film Dyes."

Motion picture print film is normally preferred for telecine scanning. The positive prints, in addition to being readily available, are already color balanced for direct viewing, and hence, they require fewer color corrections than a negative film. However, the making of a positive film print from the original negative film requires at least one extra processing step which results in some degradation of the image as well as color saturation of the resulting print relative to the negative. A negative film in a telecine scanner can handle the tone scale from highlights to shadows with less distortion than print film, resulting in better color reproduction. All things considered, therefore, it is desirable to be able to use both positive and negative films in a telecine scanner without undue inconvenience.

Ideally, a telecine scanner should measure the optical modulation caused by each dye in order to correctly estimate the red, green, and blue content of the original scene and produce a subjectively pleasing image. These measurements are difficult to obtain because the yellow, magenta, and cyan dyes used in film not only absorb light in the desired blue, green, and red bands of the spectrum, respectively, but each dye also absorbs in more than just the desired band. To eliminate the effects of the unwanted dye absorptions in the film and to improve color/tone scale quality, the ideal solution would be to have monochromatic telecine sensitivities at the three wavelengths corresponding to the peak absorptions of the three dyes. However, the narrower the spectral response of each color channel, the lower the system efficiency or sensitivity. In order to waste as little as possible of the available light, dichroic beam splitters and trimming filters are usually used to divide the light into three bands with slight overlaps in the 490 nm and 580 nm regions. Nonetheless, wide spectral responses result in color cross talk (e.g., by measuring magenta dye in the cyan measurement channel), and further result in a system gamma that is, at least to some extent, a function of density rather than color. Telecine spectral sensitivity, therefore, is necessarily a compromise between sensitivity and color/tone scale quality.

With reference to FIG. 1, there is shown a film scanner 10 which includes an illumination system 12 constructed in accordance with the present invention. The illumination system 12 comprises a light source 14 which can be, for example, a xenon lamp. One suitable xenon lamp is a Model No. LX-300f, manufactured by ILC Technology. Other light sources can be used, e.g., a tungsten-halogen light source or a metal halide light source. However, the xenon lamp is preferred because it provides a white light source with a high blue light content, and, when run with feedback, it is relatively quiet. Power to light source 14 is supplied by a linear power supply 16, for example, a PS-300 power supply, obtainable from ILC Technology.

Light from light source 14 passes through a normally-open shutter 22 and a relay lens 24. From lens 24, light passes through a hot mirror (IR reflector) 26 which removes IR radiation from 800 to 1100 nm. From hot mirror 26 the light beam passes to an IR absorber 28 which filters out light from 1000 to 2500 nm. IR absorber 28 can be, for example, an IR absorber, Glass No. 4605, manufactured by Corning Glass. From IR absorber 28, the light beam passes through a shaping filter set 30 and a $D_{min}$, or base density, filter 32, as shown schematically in FIG. 1 and in more detail in FIG. 2. The filter set 30 and $D_{min}$ filter 32 are placed in the optical path during the scanning of positive film. During the scanning of negative film, the $D_{min}$ filter 32 is removed and a filter set 31 (FIG. 3) is substituted for the filter set 30. During calibration of the scanner 10, the filter set 31 and the $D_{min}$ filter 32 are placed in the optical path 20. The appropriate filter sets for positive film, negative film, and calibration can be mounted in a filter wheel 41, as shown schematically in FIG. 10.

Light from $D_{min}$ filter 32, or from filter set 31 when $D_{min}$ filter 32 is removed, is directed to an integrating cylinder 34 through a relay lens 36, a light regulating means in the form of an aperture wheel 37, a first condensing lens 38, a plano mirror 40, and a second condensing lens 42. As will be discussed in more detail hereinafter, integrating cylinder 34 directs a diffuse line of light onto a film 44.

The light from integrating cylinder 34 is modulated by film 44 in accordance with the amounts of cyan, yellow, and magenta dye in the film, and the modulated beam passes to a pickup stage 45 of scanner 10. A projection lens 46 directs the light to a beam splitter 48 which includes a dichroic interference filter. Beam splitter 48 divides the light into one beam for a chrominance channel which is directed to a pickup device 50 and into a second beam for a luminance channel which is directed to a pickup device 52. A more complete description of beam splitter 48 can be found in the aforementioned U.S. patent application, Ser. No. 421,893, entitled "A Beam Splitter for Color Imaging Apparatus."

The pickup devices 50 and 52 are conventional photosensitive elements, such as phototubes or charge-coupled devices. Charge-coupled devices (CCD's) are typically preferred for modern telecine film scanners because they require little maintenance and adjustment and they have a long life. Pickup device 50 in the chrominance channel could include three linear CCD arrays (one array for each of the primary colors) arranged side-by-side on a unitary structure. Color separation is provided by linear color filter strips overlying the arrays. Device 52 could be a linear CCD array which functions as a high resolution luminance sensor, or detail sensor. The output signals from the arrays 50 and 52 are provided to signal processing elements (not shown).

As noted above, $D_{min}$ filter 32 is inserted into the optical path 20 between the light source 14 and the pickup stage 45, during a calibration mode and during the scan of a print film. The motion picture film 44 is removed from the optical path 20 during calibration. Filter 32 is removed during the scan of a negative film, as shown schematically by the broken-line position of the filter 32 in FIG. 3. The filter 32 provides a color density substantially equivalent to the minimum base density of a negative motion picture film, that is, a density substantially equivalent to the mask density plus the residual minimum density of the negative material due to fog and the structure of the materials. With the filter 32 in the optical path 20, the scanner 10 is adjusted so that the output signals for red, green, and blue, from the pickup stage 45 are of equal amplitude. Further details on the use of the filter 32 are disclosed in the copending U.S. patent application Ser. No. 406,407, entitled "Motion Picture Telecine Balanced for Negative Scanning," filed on Sep. 12, 1989.

If the pickup devices 50 and 52 are charge-coupled devices, it is preferable to produce a full well condition, or a substantially full well condition, with the $D_{min}$ filter 32 in the optical path 20. This insures maximum signal-to-noise performance for negative material. Full well operation, or a substantial proportion thereof, is provided by supplying sufficient light energy to the pickup stage 45. Providing sufficient intensity in the light source 14, particularly in spectral regions rendered deficient by the negative mask density (i.e., blue), and providing appropriate "trim" with the source balance filter 68, generates sufficient light energy for substantially full well operation. In order to provide sufficient intensity in the light source, the earlier-mentioned xenon light source is the preferred source.

The shaping filter sets 30 and 31 provide a means for conforming the sensitivity of the telecine scanner 10, and particularly of the pickup devices 50 and 52 to the spectral dye densities of different film materials. It is highly beneficial if the pickup devices 50 and 52 are capable of evaluating dye density at the respective spectral peaks of the different materials. This means, in practice, that different red spectral sensitivities must be provided for different materials, although it is possible to customize any of the spectral regions for different materials.

The illumination system 12 of the present invention is adapted to be used in a telecine scanner of the type in which shaping of the spectral sensitivities is accomplished in two separate parts of the scanner. Red, green and blue channel filters, e.g., linear color filter strips (not shown), are provided in conjunction with pickup device 50 for separating the light into spectral regions. The bandwidths of the channel filters are broad enough to include the spectral dye densities of a negative motion picture film and a positive (print) motion picture film. More particularly, the channel filters have spectral bandwidths in the respective colors for the film type having the limiting wavelength requirement, i.e., filters that provide the longest wavelength cutoff for blue, the broadest green bandpass, and the shortest wavelength cutoff for red.

The second aspect of spectral shaping, i.e., the further shaping of the spectral regions for a particular film material, is accomplished by the shaping filter sets 30 and 31, for negative scanning and positive scanning, respectively.

Figure 3:
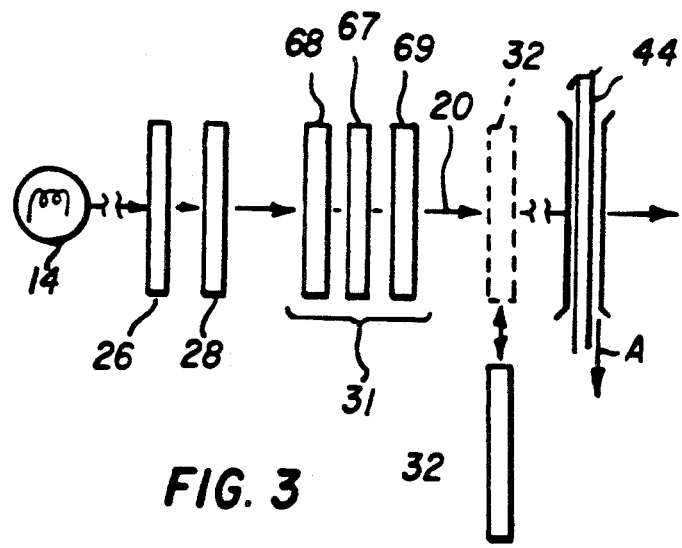
FIG. 3 shows a filter arrangement for the scanning of a negative material.

In a telecine scanner set up for negative motion picture film, as shown in FIG. 3, the filter set 31 includes an infrared (IR) cut filter 67, a source balance filter 68, and a red-green (RG) notch filter 69. The color filtering provided by the shaping filter set 31 for negative scanning, when combined with the color filtering provided by the channel filters (not shown), shape the low-band edge for blue sensitivity and to a lesser extent, the high-band edge for green sensitivity. Both band edges for red sensitivity are defined by the combination of the RG notch filter 69 and the IR cut filter 67. The effect in the red channel passband is to establish peak red sensitivity near the peak cyan dye density at 690 nm.

Figure 2:
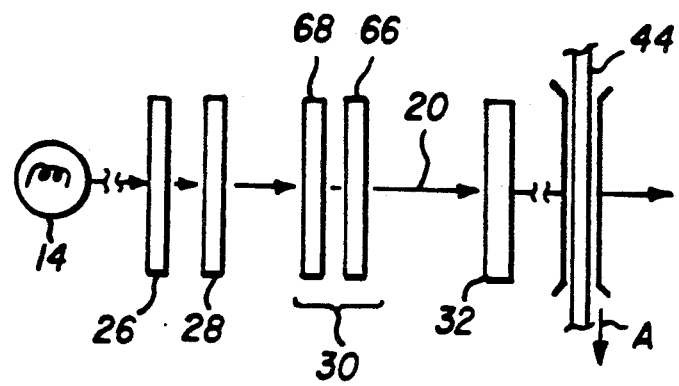
FIG. 2 shows a filter arrangement for the scanning of a print material.

For print scanning, the main objective is to shift red sensitivity downward toward the cyan dye density peak near 650 nm. The shaping filter set 30 used for print scanning, as shown in FIG. 2, includes source balance filter 68 and an infrared (IR) cut filter 66. The lower band-edge of the transmission characteristic of the IR cut filter 66 for print film is lower than the lower band-edge of the IR cut filter 67 for negative film. Consequently, the color filtering provided by the print shaping filter set 30, when combined with the color filtering provided by the color separation filters in the pickup stage, drives the passband of the red spectral region downward relative to negative scanning such that red sensitivity is centered more nearly on 650 nm. It will be apparent to those skilled in the art that certain of the filters in the filter set 30 can be changed in order to shift the scan sensitivity to match other scan criteria. For example, by shifting the scan sensitivity in the red lower, toward 620 nm, the film scanner can provide a transfer which is better matched to the visual image seen in movie projection.

The shaping filter sets 30 and 31 are preferably located in the illumination system between the light source 14 and the motion picture film 44. This is particularly important in scanner 10, since the pickup stage 45 provides an additional output to device 52 which serves as a detail sensor. Having the shaping filter sets 30 and 31 on the input side of the beam splitter 48 determines the red, green and blue content of the detail channel as well as the color channels.

Figure 4:
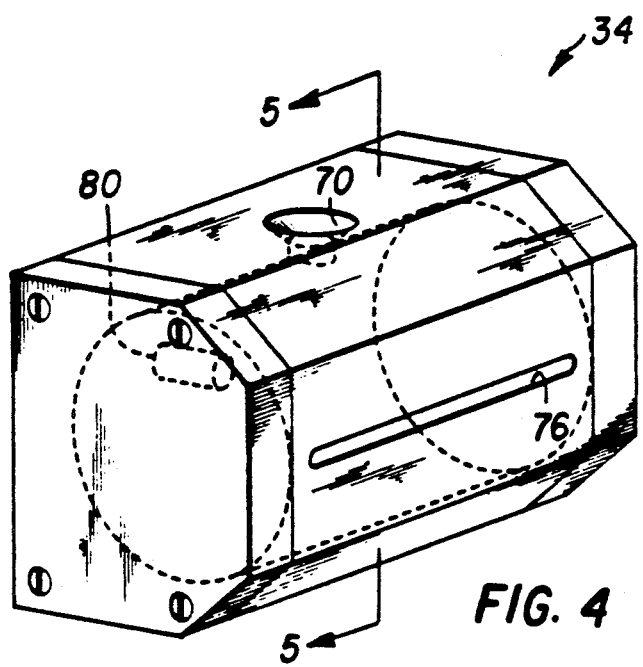
FIG. 4 is a perspective view of the integrating cylinder used in the illumination system.
Figure 5:
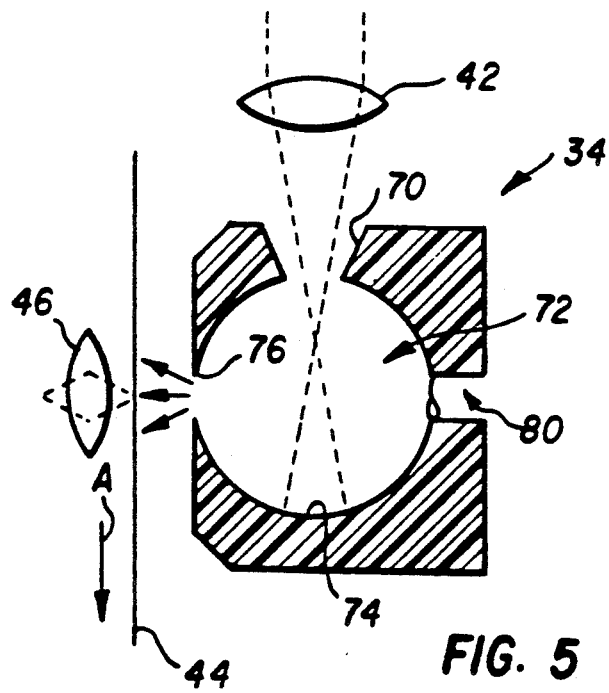
FIG. 5 is a schematic view showing the integrating cylinder in section, taken along the line 5—5 in FIG. 4, and further showing the arrangement of the cylinder relative to the film and lenses which function therewith.

The integrating cylinder 34 is shown in detail in FIGS. 4 and 5. Light is focused onto an input port 70 of a cylindrical integrating cavity 72 in cylinder 34. Preferably, the light is brought into a focus just inside the cavity, as shown in FIG. 5, and diverges before striking an opposite wall of the cavity 72. The internal surface 74 of the integrating cavity 72 is diffusely reflecting. The integrating cavity 72 defines an output slit 76 that emits a line of light to illuminate the film 44. In order to effect an area scan of the film, the image on the film 44 is sensed one line at a time by pickup stage 45 as the film is advanced in the direction of arrow A (FIG. 1). Temporal control of the illumination intensity is achieved by sampling the diffuse light from the integrating cavity 72. A feedback port 80 is provided in the cavity 72 to remove a sample of the diffuse light. The light exiting the feedback port 80 is directed by means of an optical fiber 81 to a photosensor such as a silicon photodiode 83. The output from photodiode 83 is provided to power supply 16 through an integrator circuit 82.

Integrating cavity 72 is preferably machined from a block of diffusely reflecting polytetrafluoroethylene plastic, known as Spectralon®, available from the Labsphere Corporation, North Sutton, New Hampshire. In one exemplary integrating cylinder, the integrating cavity is a circular cylinder 38 mm long and 20 mm in diameter. The input port 70 is a round hole 6-8 mm in diameter, the feedback port 80 is a round hole about 4 mm in diameter in the cavity 72. The exit slit 76 is 2 mm wide by 30 mm long. A more complete description of the integrating cylinder described herein can be found in the aforementioned U.S. Pat. No. 4,868,383.

As noted previously, it is desirable for a telecine film scanner to have the capability to scan a wide range of films. These films can have variations in: film format, e.g., Academy 35, super 35, 16 mm, and super 16; film perforations-the film can have 3 perforations per frame or 4 perforations per frame; film transport speed-18, 24, or 30 frames per second; and film types e.g., ECN (Eastman Color Negative), and ECP (Eastman Color Print). These variations in the film can result in differences in the integration time needed for the CCD sensors. In a film, such as Academy 35 which has 4 perforations and is transported at 30 fps, the sensor integration time is relatively short, and thus, the maximum light power is needed. As the integration time increases in other scan modes, sensor full well can be maintained with film illumination at lower power levels.

Table I shows different film scan modes for the proposed 1125/60 HDTV broadcast standard. In Table I, the film type is indicated in the first column, the film transport speed (Film FR) is given in frames per second, the aperture height (Apert Ht) is given in millimeters, and the line time is given in microseconds.

As noted above, the greatest amount of light is needed when scanning Academy 35, 4 perf, at 30 fps, since the sensor integration time (or line time) is the shortest; the integration times for the other film formats are normalized to this Academy 35 film, and the resulting values are shown in Table I under the column labeled "Cal. Mode and Effective CCD Sensor Gain." The values in this column indicate how the light level at the CCD sensors will change with the different scan modes (Effective CCD Sensor Gain), and also how the light level in the integrating cylinder changes while the scanner is in the calibration mode (Calibration Mode Gain). When the scanner is changed from Cal mode to ECN mode, the pre-gate filters are changed, and the film is inserted after the gate. The effective CCD sensor gain (at $D_{min}$) is constant, but the light level in the integrating cylinder 34 is higher than in the Cal mode. Thus, the cylinder 34 sees gains different from those seen by the sensor; this is shown in the last two columns of Table I for ECN and ECP, respectively.

The illumination system 10 can also function with other standards, such as the 1250/50 Eureka standard and the 1050/59.94 NBC standard. The effective gain is the light level change seen by the CCD sensors. With reference to Table I, it can be seen that about 48% less light is needed to scan Super 35 (3 perf, ECN film at 24 FPS) than is needed to scan Academy 35 (4 perf ECN film at 30 FPS). In addition to the film scan modes shown in Table I, a "varispeed" mode can be used in which special effects films are scanned at speeds as slow as 6 feet per second. The light level needed for this mode requires only about 10% of the maximum illumination. Thus, a 90% dynamic range in signal level (or Effective Gain) is required to provide illumination to the CCD sensors.

TABLE I

| Film Type | Film FR (fps) | Apert Ht (mm) | Fr Pitch (mm) | Line time (μs) | Cal. Mode Gain and Effective CCD Sensor Gain | Pre-Gate ECN Gain | Pre-Gate ECP Gain |
| --- | --- | --- | --- | --- | --- | --- | --- |
| Academy 4p | 24 | 11.79 | 18.96 | 25.0336 | 0.8 | 2.635 | 1.005 |
|  | 30 | 11.79 | 18.96 | 20.0269 | 1 | 3.293 | 1.257 |
| Academy 3p | 24 | 11.79 | 14.22 | 33.3781 | 0.6 | 1.976 | 0.754 |
|  | 30 | 11.79 | 14.22 | 26.7025 | 0.75 | 2.47 | 0.943 |
| Super 35 4p | 24 | 13.5 | 18.96 | 28.6645 | 0.7 | 2.305 | 0.88 |
|  | 30 | 13.5 | 18.96 | 22.9316 | 0.87 | 2.865 | 1.093 |
| (archival) | 18 | 13.5 | 18.96 | 38.2193 | 0.52 | 1.712 | 0.653 |
| Super 35 3p | 24 | 13.5 | 14.22 | 38.2193 | 0.52 | 1.712 | 0.653 |
|  | 30 | 13.5 | 14.22 | 30.5754 | 0.66 | 2.173 | 0.829 |
| 16 mm | 24 | 5.43 | 7.605 | 28.7441 | 0.7 | 2.305 | 0.88 |
|  | 30 | 5.43 | 7.605 | 22.9953 | 0.87 | 2.865 | 1.093 |
| (archival) | 18 | 5.43 | 7.605 | 38.325 | 0.52 | 1.712 | 0.653 |
| Super-16 | 24 | 7.04 | 7.605 | 37.2668 | 0.54 | 1.778 | 0.678 |

TABLE I-continued

| Film Type | Film FR (fps) | Apert Ht (mm) | Fr Pitch (mm) | Line time (μs) | Cal. Mode Gain and Effective CCD Sensor Gain | Pre-Gate ECN Gain | Pre-Gate ECP Gain |
| --- | --- | --- | --- | --- | --- | --- | --- |
| | 30 | 7.04 | 7.605 | 29.8134 | 0.67 | 2.206 | 0.842 |

As noted above, the pre-gate filters are changed for the film modes ECN and ECP, and thus, the light level (and also spectral balance) in the integrating cylinder is also changed. Consequently, the pre-gate gain seen by the integrating cylinder is different from that seen by the CCD sensors.

The xenon lamp 14 can be modulated to different power levels, and it can be modulated down to about 40% of peak power. At the lower power level, the lamp cathode is too cold for proper arcing, and the output becomes highly unstable. In addition, as the lamp power is decreased from its normal operating range (around 18A), the signal to noise ratio of the light output decreases, even with feedback being used. The signal to noise levels of the light source must be better than 55 dB to avoid flicker artifacts in the video image. This further limits the lower power limit, for effective modulation, to about 55% of peak power. The lower limit of lamp current is about 14A. If the lamp current can be kept constant within its normal operating range, lamp life is enhanced.

Figure 10:
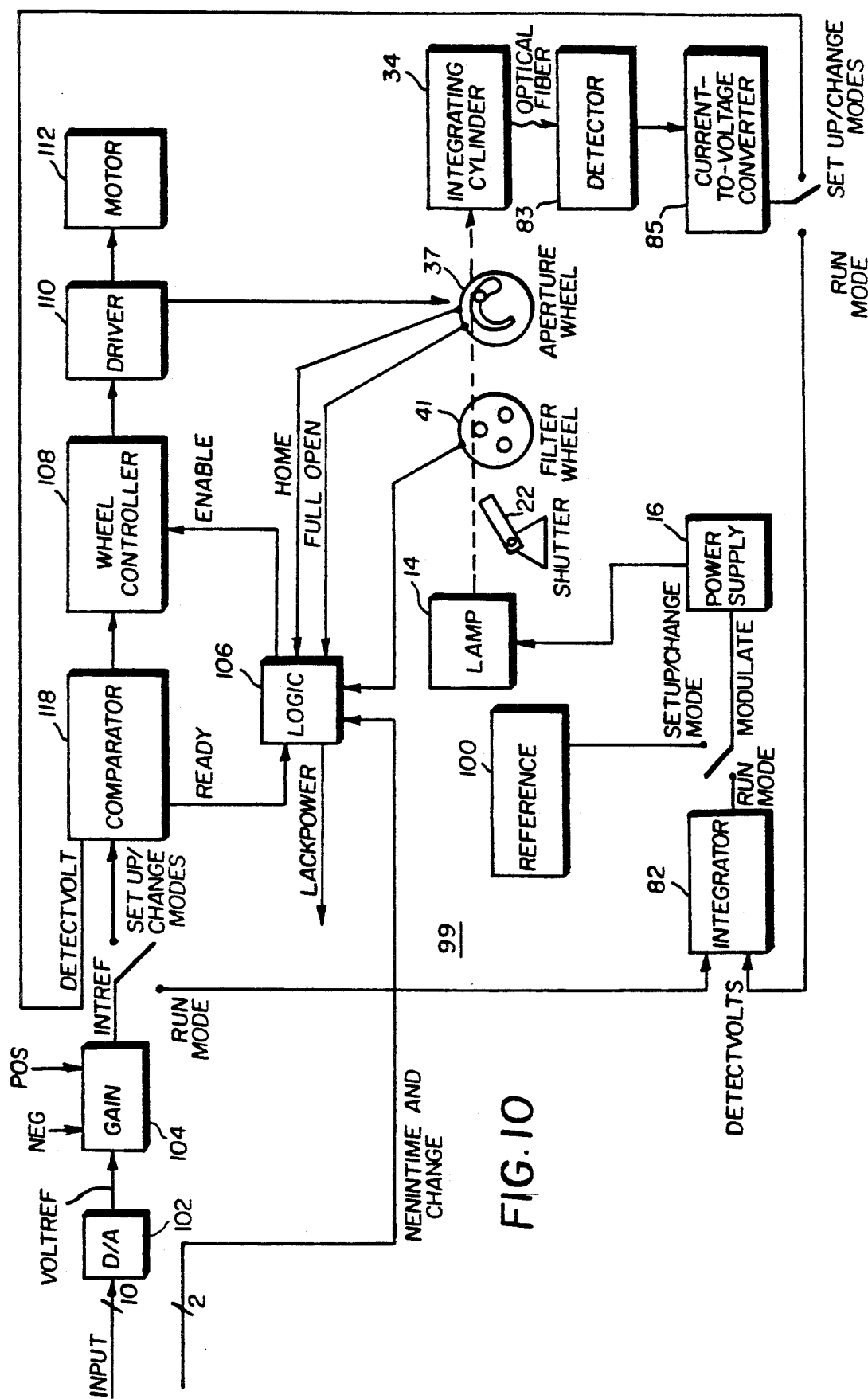
FIG. 10 is a schematic diagram of the illumination control circuit.

It will be apparent from the above that lamp modulation alone is insufficient to produce the dynamic range necessary to scan all film modes at full well. In accordance with the present invention, an extended dynamic range is achieved, without comprising the signal to noise ratio, through the incorporation of an automatic light control means into the illumination system. The light control means includes a variable power supply for the xenon lamp, an adjustable aperture wheel 37, and an illumination control circuit 99 which is shown in FIG. 10.

Aperture wheel 37 can be motor driven to obstruct all, or a part of, the light that is directed into the integrating cylinder. Since an asymmetric aperture 39 is used in wheel 37, rather than a centered iris, the light beam is obstructed asymmetrically. The illumination system 10, however, uses integrating cylinder 34 which is spatially source independent. That is, spatial variations in the input light, such as variations from arc plasma wander, air currents, or obstructions, have negligible impact on the distribution of the light output of integrating cylinder 34. An aperture wheel is preferred in the present invention instead of, for example, an adjustable neutral density filter wheel, since the aperture wheel is lower in cost, lighter in weight, and is not spectrally dependent. Aperture wheel 37 is preferably formed from a bead-blasted aluminum disc. It would also be possible in the present invention to use a galvonometer-driven vane instead of aperture wheel 37.

Illumination control circuit 99 is adapted to control the various elements in system 10 in order to deliver the proper amount of light to a film 44 for any given scan mode. Circuit 99 is adapted to function with a microprocessor (not shown) in the film scanner which receives an input indicating the type of film being scanned. The required light level for that film is determined by the microprocessor from a lookup table, and a 16 bit word, representative of the required light level, is generated by the microprocessor. The 16 bit word is truncated to a 10 bit word which is provided to a D/A converter 102. An analog voltge output VOLTREF from converter 102 is put through a gain circuit 104 to provide an INTREF signal which will have the appropriate gain (neg, pos, or cal) and will act as the reference for the light level.

In a set-up mode of the film scanner a signal from logic circuit 106 would enable wheel controller 108 which actuates a driver 110. Driver 110 energizes motor 112 to drive aperture wheel 37 to its HOME position (not shown) in which no light is allowed to pass through to the integrating cylinder 34; logic circuit 106 would also effect the movement of filter wheel 41 to the appropriate position (neg, pos, or cal), indicated by sensors (not shown) on the wheel. Shutter 22 is initially in a closed position in which no light is allowed to pass through to the filter wheel 41. The power supply 16 for lamp 14 is set at a nominal current of 18 amps by reference circuit 100 (FIG. 10). Once a signal NEWINTIME from the microprocessor becomes active and the system is ready to operate, the shutter 22 opens and the aperture wheel 37 opens up until a signal from a comparator 118 indicates that the amount of light in the integrating cylinder 34 (as indicated by a voltage, DETECTVOLTS, received from photodiode 83 through a current-to voltage converter 85) is equal to or slightly greater than INTREF. Once this signal from comparator 118 is received, the set-up mode is completed; the fine-tuning circuitry of integrator circuit 82 is then locked in, filtering out the noise by constantly comparing the DETECTVOLTS signal with INTREF signal and integrating out the difference. The output of integrator circuit 82 is used as feedback signal, MODULATE, to modulate the power supply 16.

Small changes in light level can be accomplished by simply changing the 10 bit word (thereby changing INTREF) and having the difference accounted for in the modulation. Larger changes (more than 10%), however, require a coarse adjustment which is started when the microprocessor activates the change bit; when this occurs, logic circuit 106 switches the MODULATE line to the reference circuit 100 which resets the lamp at 18 amps, and the aperture wheel 37 is moved in the proper direction to account for the change. Once the comparison to the new INTREF is made, the fine tuning circuitry is again locked in.

As the lamp nears the end of its life, the aperture wheel 37 will open further for a given INTREF to account for lamp degradation. At some point in the life of the lamp, the wheel 37 will reach its full-open position for certain scan modes. In the full-open position, the wheel 37 is blocking no light from the integrating cylinder; if there is still insufficient light, the lamp current may be raised to more than 18 amps. If the lamp reaches about 22 amps in the full open position, circuit 106 sends a LACKPOWER signal to the microprocessor indicating that the lamp is running at full power, and a new lamp is needed.

Figure 6:
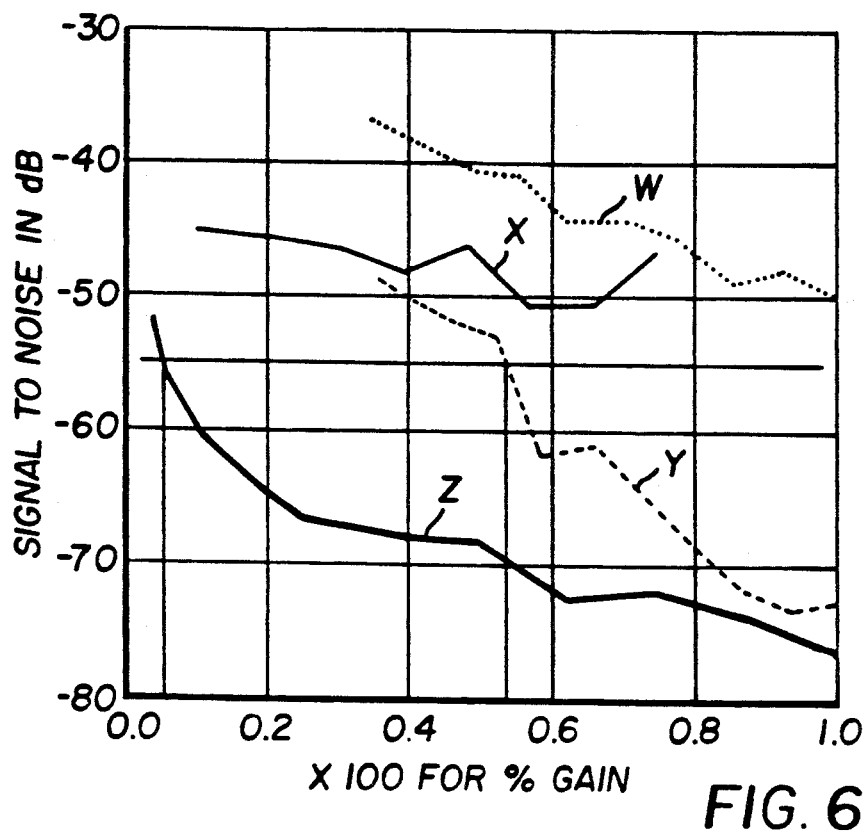
FIGS. 6 and 7 are graphs showing signal-to-noise ratios for various operating conditions with the lamp at 22 A and 18 A, respectively.
Figure 7:
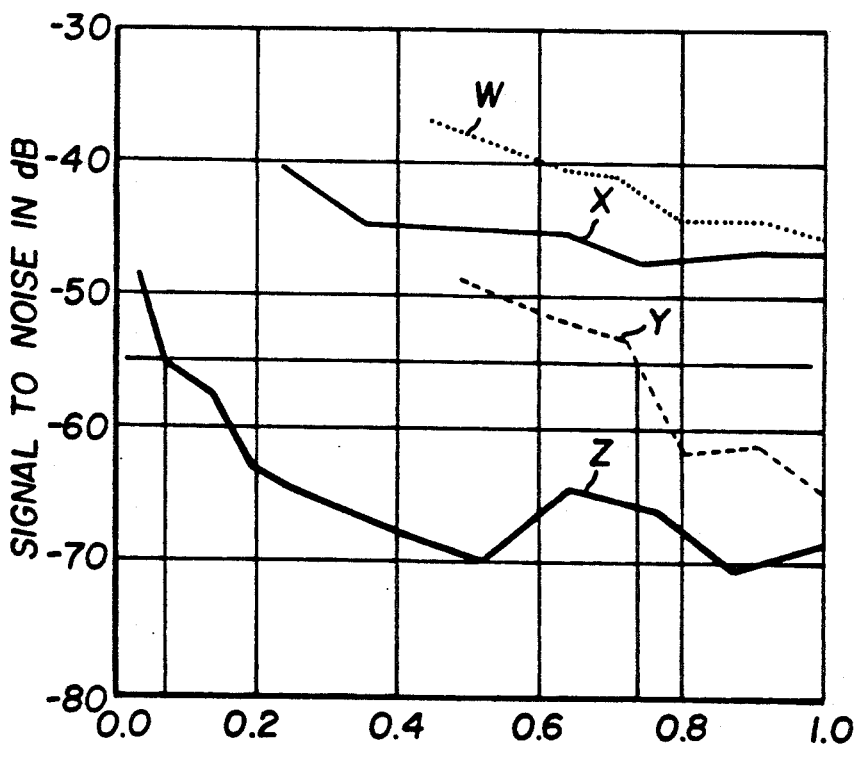

With reference to FIGS. 6 and 7, signal-to-noise ratios are shown for various operating conditions of the illumination system 10. Ratios for a lamp current of 22A are shown in FIG. 6, and ratios for a lamp current of 18A are shown in FIG. 7. In both FIGS. 6 and 7, signal-to-noise ratios are represented by the curves w-z where curve w is for an illumination system in which there is no feedback and no aperture wheel, curve x is for a system having an aperture wheel but no feedback, curve y is for a system using feedback but no aperture wheel, and curve z is for the system of the present invention in which both feedback and an aperture wheel are used. As shown in FIGS. 6 and 7, the CCD effective signal can be reduced to about 6% and the signal to noise still remains below 55 dB.

Figure 8:
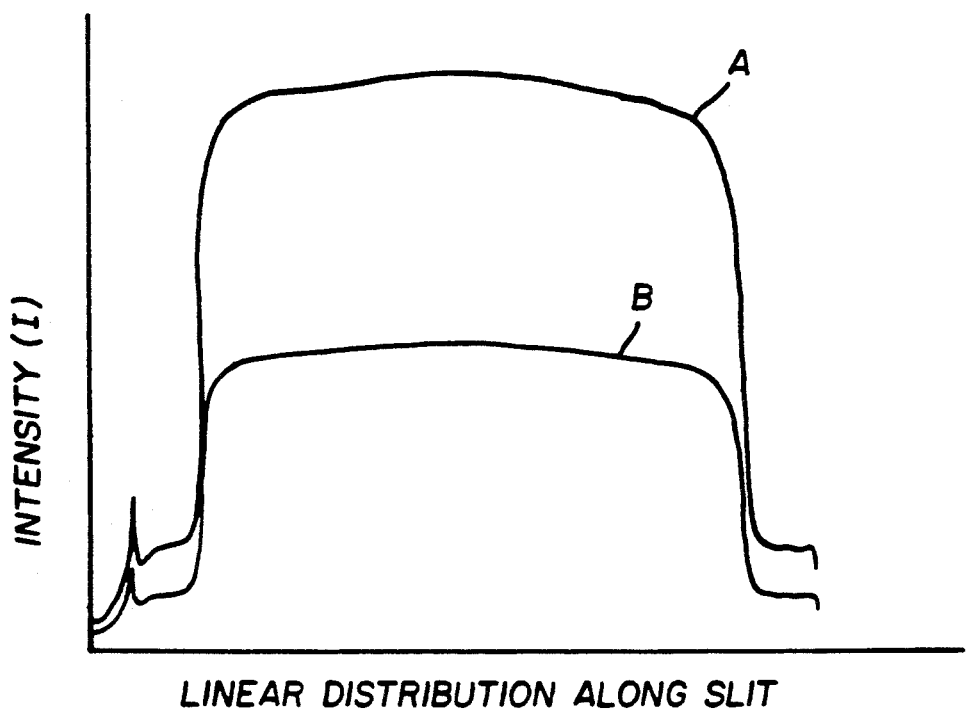
FIG. 8 is a graph showing the intensity distribution of light along the output slit of the integrating cavity for two different aperture wheel settings.

With reference to FIG. 8, there are shown curves labeled A and B which show the output of the integrating cylinder 34 along the length of output slit 76. Curve A shows the output when the aperture 39 in wheel 37 is wide open, i.e., in a position to allow the maximum amount of light to pass. Curve B shows the output when wheel 37 has been adjusted to pass 50% of the maximum amount of light. As illustrated by these curves, the output line uniformity is substantially unchanged with the 50% aperture modulation.

Figure 9:
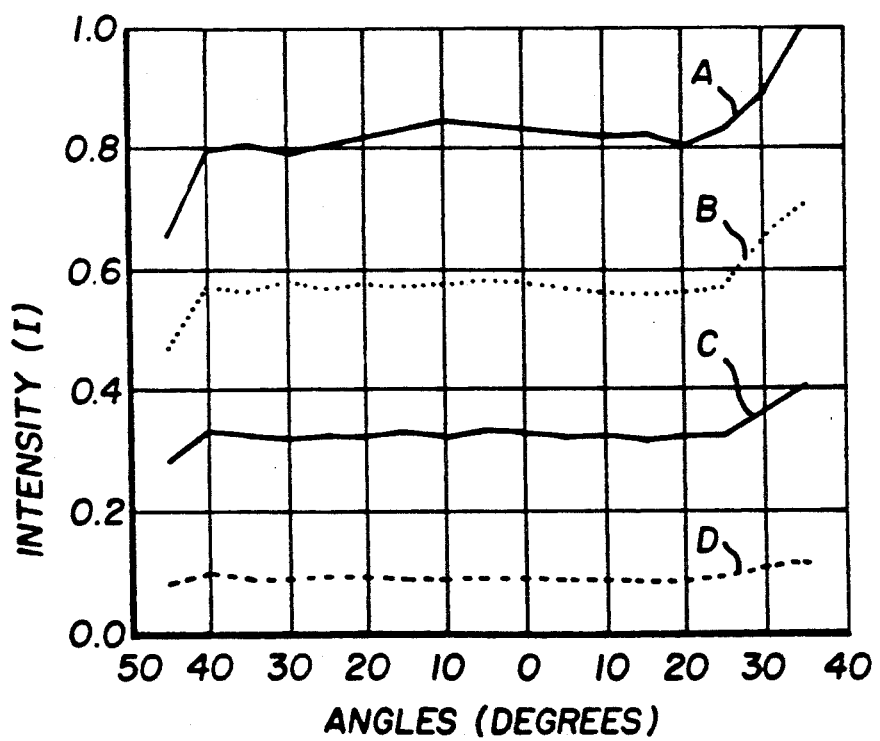
FIG. 9 is a graph illustrating the angular distribution of light along the output slit for different illumination intensities.

It is important to obtain a uniform angular distribution of light from slit 76 in order to achieve maximum scratch suppression. Angular distribution of the light is determined by the configuration of the walls of cavity 74 adjoining slit 76, and a preferred configuration is shown in FIG. 5. In the use of a xenon light source with a cylinder 34 having a slit 76 as shown in FIG. 5, a rather uniform angular distribution of light can be obtained over a range of gains in an angle which extends from 45° above the optical axis to 45° below the optical axis. In FIG. 9, the angular uniformity of the output beam from slit 76 (film scan direction) is shown for a wide range of angles in curves a-d. Curves a-d show the angular uniformity of the output beam for full gain, 70% gain, 40% gain, and 10% gain, respectively. As these curves show, the output angular uniformity is substantially unchanged with as much as 90% aperture modulation.

The invention has been described in detail with particular reference to the preferred embodiment thereof, but it will be understood that variations and modifications can be effected within the spirit ans scope of the invention.

We claim:

1. An illumination system for a film scanner, said system being adapted to provide a line of illumination on a film which is supported for movement in a film gate of the scanner, said system comprising:
   a light source which is adapted to provide a light beam along an optical path in said system;
   an integrating cylinder located along said optical path for receiving light from said source and for producing a line of diffuse illumination on said film; and
   light control means located in said optical path between said light source and said integrating cylinder for controlling the amount of light which is delivered to said integrating cyliner; and means for sensing the amount of light in said optical path and for controlling the current to said light source in accordance with the amount of light sensed; said light control means being automatically adjustable in accordance with the amount of the light produced by said light source and the type of film being scanned.

2. An illumination system for a film scanner, said system being adapted to provide a line of illumination on a film which is supported for movement in a film gate of the scanner, said system comprising:
   a light source which is adapted to provide a light beam along an optical path in said system;
   an integrating cylinder located along said optical path for receiving light from said source and for producing a line of diffuse illumination on said film;
   light control means located in said path between said light source and said integrating cylinder for automatically controlling the amount of light which is delivered to said integrating cylinder; and
   means for adjusting said light control means in accordance with the amount of light produced by said light source and the type of film being scanned.

3. An illumination system, as defined in claim 2, wherein filter means are located along said optical path for receiving said light beam from said source and for controlling the spectral content of light issuing therefrom.

4. An illumination system, as defined in claim 2, wherein said integrating cylinder has an elongated cylindrical light integrating cavity having diffusely reflecting walls, and said cylinder includes an output slit communicating with said cavity through which the line of illumination exits.

5. An illumination system, as defined in claim 4, wherein the integrating cavity is about 38 mm long by about 20 mm in diameter, and the output slit is about 30 mm long by about 2 mm wide.

6. An illumination system, as defined in claim 2, wherein said light control means includes regulating means in said light path for controlling the amount of light which travels along said optical path.

7. An illumination system, as defined in claim 6, wherein said regulating means includes an aperture wheel which can be rotated to change the amount of light which travels along said path.

8. An illumination system, as defined in claim 7, wherein said light source is a xenon lamp.

9. An illumination system, as defined in claim 8, wherein said light control means includes means for sensing the amount of light in said integrating cylinder and for controlling the current to said lamp in accordance with the amount of light sensed.

10. An illumination system, as defined in claim 2, wherein said means for adjusting said light control means varies the amount of light produced by said light source in accordance with the luminance and chrominance of the film being scanned.

11. An illumination system for a film scanner, said system being adapted to provide a line of illumination on a film which is supported for movement in a film gate of the scanner, said system comprising:
   a light source which is adapted to provide a light beam along an optical path in said system, said light source including a xenon lamp;
   an integrating cylinder located along said optical path for receiving light from said source and for producing a line of diffuse illumination on said film;
   means for sensing the amount of light in said integrating cylinder and for controlling the current to said lamp in accordance with the amound of light sensed;
   light control means located in said path between said light source and said integrating cylinder for controlling the amount of light which is delivered to said integrating cylinder, said light control means comprising:

regulating means in said light path for controlling the amount of light which travels along said optical path, said regulating means including an aperture wheel which can be rotated to change the amount of light which travels along said path;

means for controlling the position of said aperture wheel in accordance with an input from said sensing means and an input indicative of the type of film being scanned.

* * * * *